United States Patent
Duke

(10) Patent No.: US 7,150,773 B1
(45) Date of Patent: Dec. 19, 2006

(54) LIQUID EXTRACTOR

(76) Inventor: Bobby G. Duke, 5302 Greenbriar, Corpus Christi, TX (US) 78413

( * ) Notice: Subject to any disclaimer, the term of this patent is extended or adjusted under 35 U.S.C. 154(b) by 0 days.

(21) Appl. No.: 11/400,357

(22) Filed: Apr. 10, 2006

(51) Int. Cl.
*B01D 51/00* (2006.01)

(52) U.S. Cl. ............ 55/418; 55/426; 55/428; 55/447; 96/189

(58) Field of Classification Search ........ 55/319, 55/418, 419, 426, 428, 447, 505
See application file for complete search history.

(56) References Cited

U.S. PATENT DOCUMENTS

| | | | |
|---|---|---|---|
| 2,547,769 A | * | 4/1951 | Packie et al. ........ 55/337 |
| 3,483,678 A | * | 12/1969 | Cioffi et al. ........ 55/348 |
| 4,617,031 A | | 10/1986 | Suh et al. |
| 4,755,194 A | * | 7/1988 | Rooker et al. ........ 95/258 |
| 5,203,891 A | | 4/1993 | Lema |
| 6,376,732 B1 | | 4/2002 | Ngan |
| 6,547,862 B1 | | 4/2003 | Dean |
| 6,673,135 B1 | | 1/2004 | West |
| 6,699,308 B1 | | 3/2004 | Nilsen et al. |

* cited by examiner

*Primary Examiner*—Robert A. Hopkins
(74) *Attorney, Agent, or Firm*—Cantor Colburn LLP

(57) ABSTRACT

A liquid device for extracting liquids entrained in gasses flowing through a pipeline consists of a housing having a separation and collection chamber for the extracted liquids and a flow through passage for the gasses being dried. As the gasses flow into an extractor insert, they first flow through a diffuser which aligns the gas flow and reduces the pressure in the flow. As the gasses hit the concave end of the extractor insert they are forced into a spiraling flow within the insert. The combination of reduced pressure and the spin cause any entrained liquids to be spun out of the gas flow. Both the gas and the liquids them pass through apertures in the lower surface of the extractor insert, with the liquids dropping into the collection chamber for later evacuation, while the gasses rise to an outlet port which exits to the pipeline.

11 Claims, 5 Drawing Sheets

LIQUID EXTRACTOR

BACKGROUND OF THE INVENTION

1. Field of the Invention

The present invention relates to equipment for separating liquids entrained in gasses flowing through a gas line. More particularly, the invention comprises a device for passively separating fluids from gasses flowing through a gas line by means of a pressure drop within the gas flow, centrifugal force, and gravity, relying solely upon the reaction of the gas to the physical configuration of the flow path as opposed to relying on the use of external drying means or active manipulation of the gas.

2. Description of the Prior Art

As gasses are processed and transmitted by pipe, a certain amount of fluids are either inherently present or picked up from the atmosphere. It is desirable to remove these entrained fluids prior to the use of the gasses.

U.S. Pat. No. 6,699,308 issued to Finn Patrick Nilsen, et al. on Mar. 2, 2004, discloses a METHOD AND APPARATUS FOR THE DRYING OF NATURAL GAS wherein an absorbent is used to absorb a fluid from a gas. By contrast, the present invention introduces no outside absorbent into the drying process.

Hugh M. West discloses a SYSTEM AND METHOD OF SEPARATING ENTRAINED IMMISCIBLE LIQUID COMPONENT OF AN INLET STREAM in U.S. Pat. No. 6,673,135, issued on Jan. 6, 2004, and a SYSTEM FOR SEPARATING AN ENTRAINED LIQUID COMPONENT FROM A GAS STREAM in U.S. Pat. No. 6,576,029, issued on Jun. 10, 2003, wherein gasses are passed from an inlet tube into a plurality of vortex tubes to separate entrained liquids from the gasses. The present invention utilizes only a single extractor tube having extractor apertures in a lower surface, thereof.

A ROTARY PHASE SEPARATOR WITH INTEGRAL ACCUMULATOR AND OUTLET VALVE is disclosed by W. Clark Dean, in U.S. Pat. No. 6,547,862, issued on Apr. 15, 2003. A motor and shaft are used to rotate the gas, thereby drive the liquid outwardly to separate it from the gasses. By contrast, the present invention uses no external propulsion methods to spin the gasses in the separation process.

U.S. Pat. No. 6,376,732, issued to Daniel Yuk-Kwan Ngan, et al. on Apr. 23, 2002, discloses a WETTED WALL VAPOR/LIQUID SEPARATOR, in which hydrocarbon and steam are utilized to separate liquids from a gas stream. The present invention introduces no external elements in the separation process.

A LIQUID/GAS SEPARATOR is disclosed in U.S. Pat. No. 5,203,891, issued to Luis E. Lema on Apr. 20, 1993, in which a vortex is used to separate fluids from a gas flow.

Sun L. Suh, et al. disclose a HYBRID DOUBLE HYDROCYCLONE-GRAVITY GAS/LIQUID SEPARATOR in U.S. Pat. No. 4,617,031, issued on Oct. 14, 1986, in which separation is achieved through a combination of centrifugal force and retention within the separator. The present invention, by contrast, passes the gasses through the separator without retention.

A LIQUID-GAS SEPARATOR is disclosed by Charles C. Mugford in U.S. Pat. No. 3,796,026, issued on Mar. 12, 1974, wherein separated fluids are bled from the separator by a portion of the gas stream, which is then returned to the main flow line.

None of the above inventions and patents, taken either singly or in combination, is seen to describe the instant invention as claimed.

SUMMARY OF THE INVENTION

The present invention provides a simple and economical method for separating entrained fluids from a gas flow through the use of pressure reduction, centrifugation, and gravity without the introduction of any elements outside of the flow of the gasses through the lines.

Accordingly, it is a principal object of the invention to provide a liquid extractor which is completely self contained.

It is another object of the invention to provide a liquid extractor which requires no electrical connections or introduction of elements from outside of the flow.

It is a further object of the invention to provide a liquid extractor which is easy to install into a gas line.

Still another object of the invention is to provide a liquid extractor which is compact.

An additional object of the invention is to provide a liquid extractor which is economical to produce, operate and maintain.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
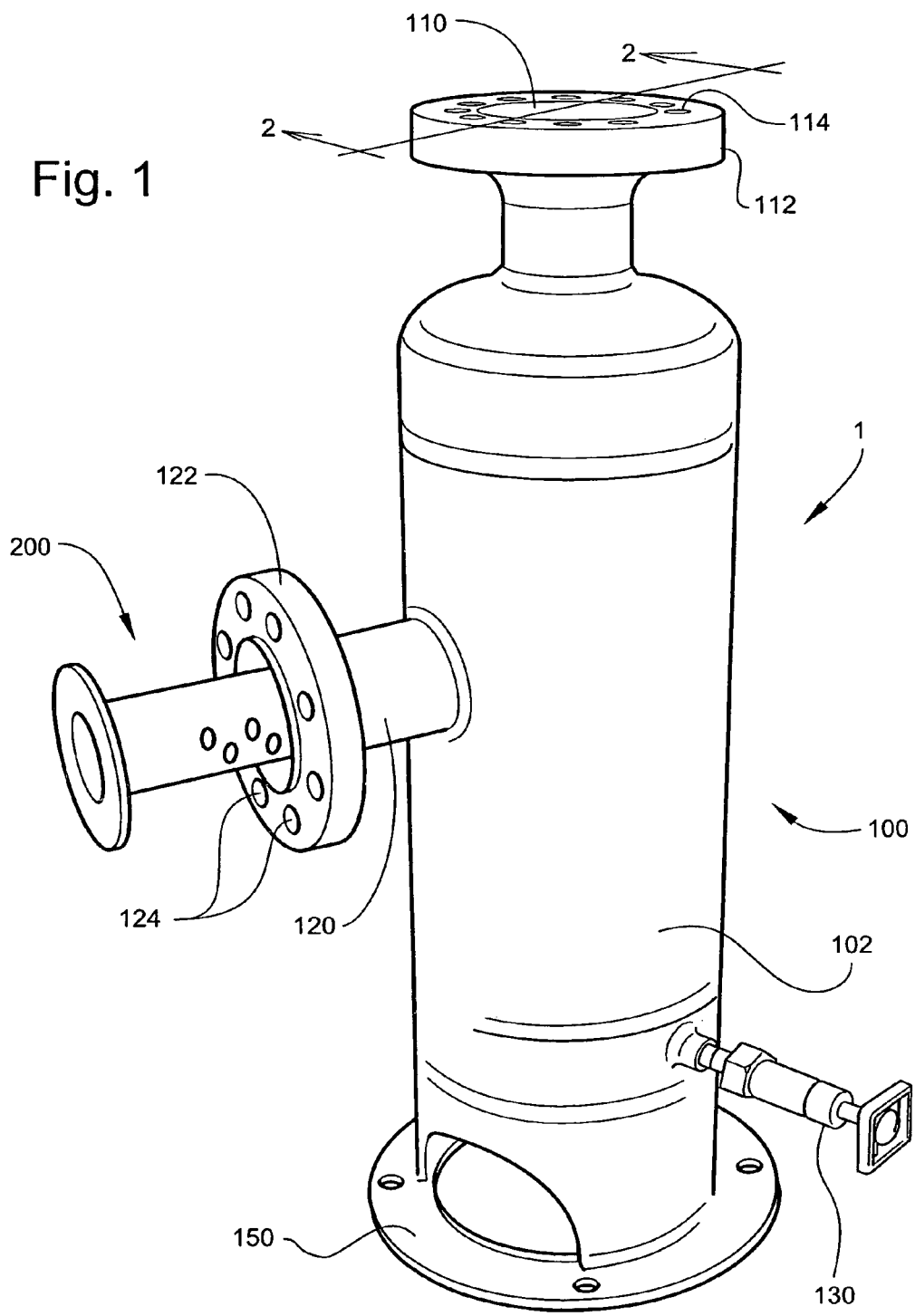
FIG. 1 is a partially exploded, perspective view of the liquid extractor of the present invention.
Figure 2:
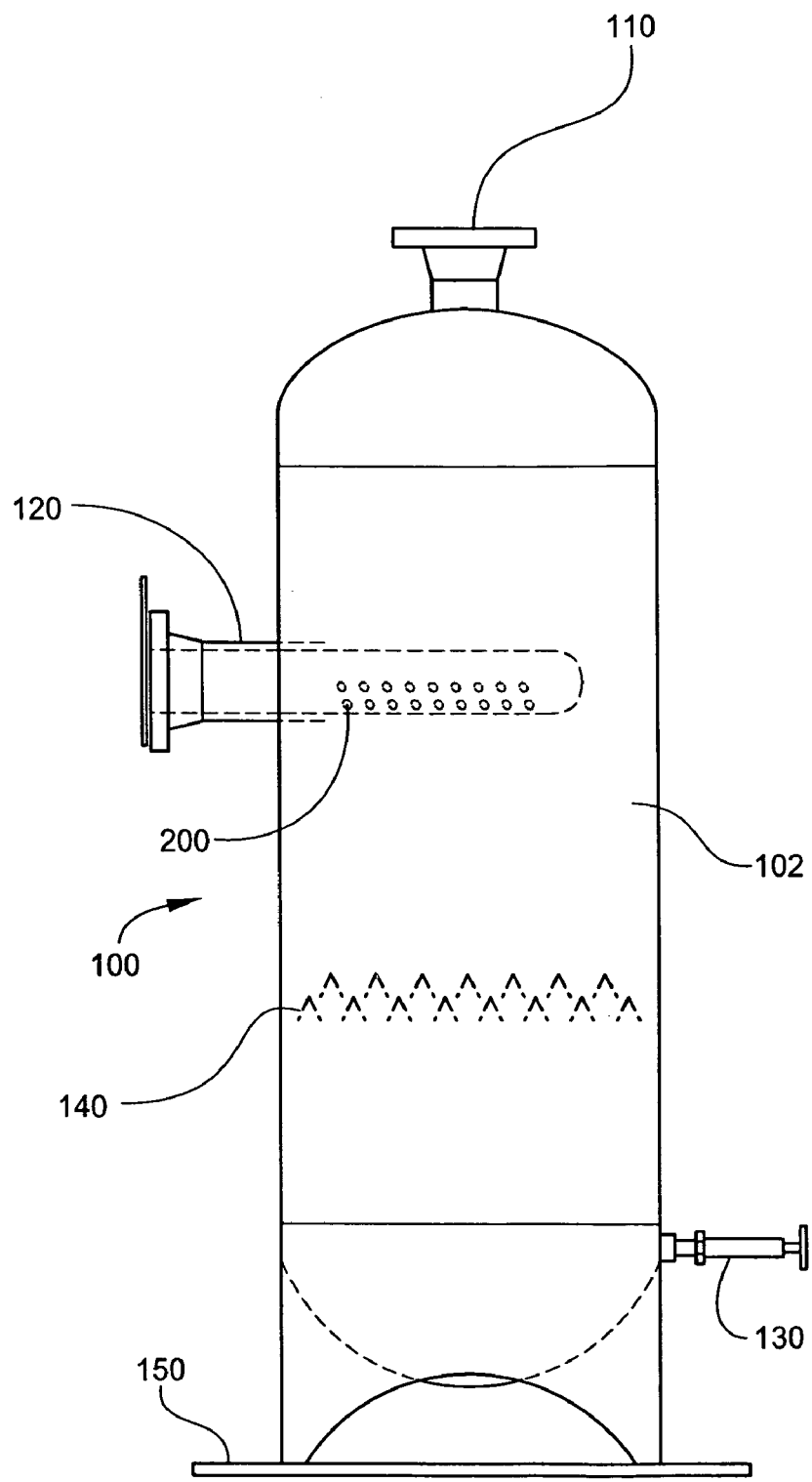
FIG. 2 is a cut away view of the liquid extractor at line 2—2 of FIG. 1.
Figure 3:
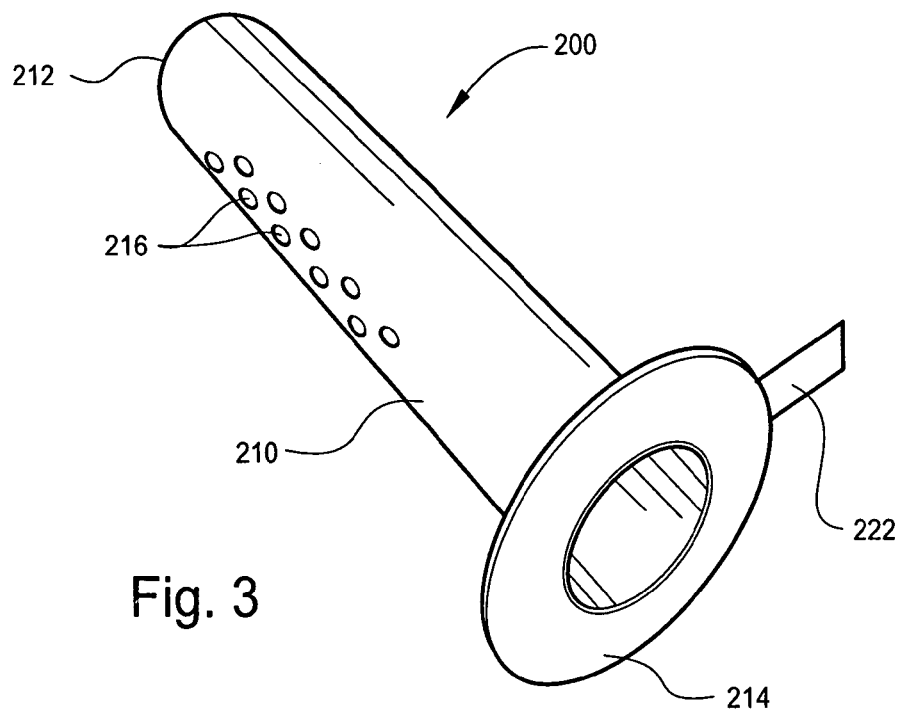
FIG. 3 is a perspective view of the extractor insert of the present invention, without the diffuser in place.
Figure 5:
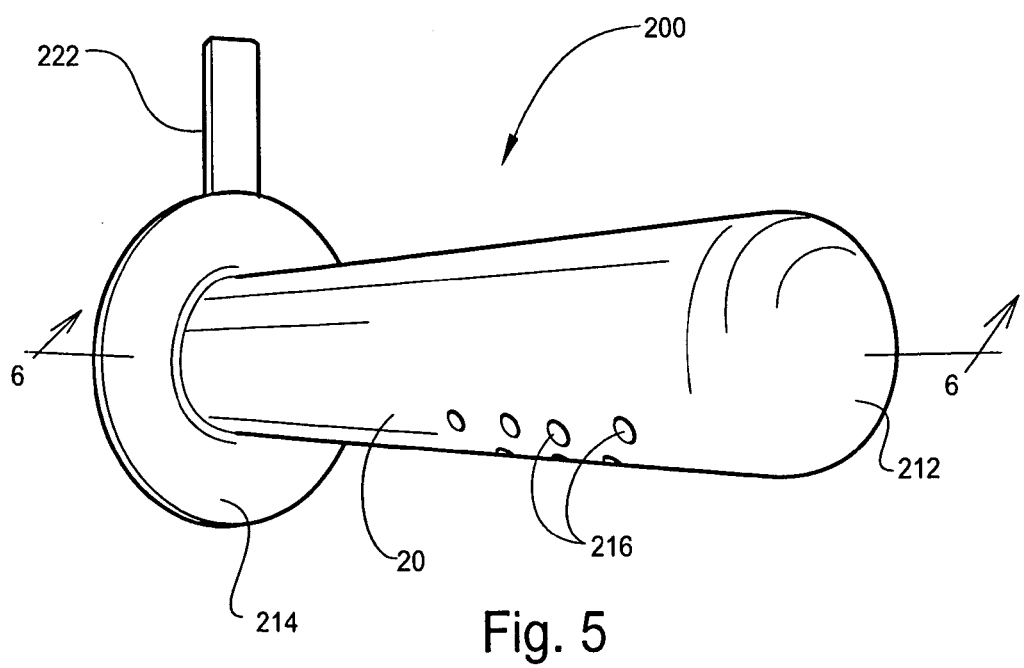
FIG. 5 is a second perspective view of the extractor insert of the present invention, showing the rounded end of the insert.

The liquid extractor 1 of the present invention consists of two elementary parts, an extractor housing 100 and an extractor insert 200, illustrated at FIGS. 1 through 6.

In its simplest description, the extractor housing 100 (FIGS. 1 and 2) consists of a substantially vertical and substantially cylindrical separation chamber 102, being closed at a lower end for the collection of liquids extracted from a gas passing through the extractor 1, and having a gas outlet 110 at an upper end. The gas outlet 110 consists of a substantially cylindrical tube open to and extending upwards from the upper end of the separation chamber 102, having an outlet flange 112 mounted around substantially normal to the open, upper end thereof. A plurality of apertures 114, evenly spaced one from another and equidistant from a center point of the outlet flange 112, are formed through the outlet flange 112. The apertures 114 are adapted for matingly aligning with corresponding apertures formed in a cooperating flange (not shown) formed in a pipe (not shown) to which the liquid extractor 1 is to be attached.

An extractor insert sleeve 120 extends from the extractor housing 100, substantially normal to a side of the of the extractor housing 100, and at a distance from the lower end of the extractor housing 100. The extractor insert sleeve 120 consists of a substantially cylindrical tube having an open first end exterior of housing 100 and a second open end extending into the separation chamber 102. An insert sleeve flange 122 is mounted substantially normal to and around the first, open end thereof. A plurality of apertures 124, evenly spaced one from another and equidistant from a center point of the insert sleeve flange 122, are formed through the insert sleeve flange 122. The apertures 124 are adapted for matingly aligning with corresponding apertures formed in a cooperating flange (not shown) formed in a pipe (not shown) to which the liquid extractor sleeve 120 is to be attached.

A drain 130 is formed in the lower portion of the separation chamber 102. The drain 130 may be of a variety of designs, and is not considered to be inventive in and of itself, therefore, it will not be discussed in further detail. It would be evident to one of ordinary skill in the art, however, that the drain 130 could be of a manual variety or include sensors which would detect the presence of an accumulation of liquid in the separation chamber 102 and open and close the drain 130.

A liquid permeable baffle 140, separates the separation chamber into an upper portion and a lower portion. As liquid is separated from a gas, as will be further detailed hereinbelow, the liquid passes through the baffle 140 into the lower portion of the separation chamber 102, while the gas rises to the gas outlet 110. Ideally, the permeability of the baffle 140 is one way, such that the liquid may pass into the lower portion of the chamber, while the vapors of the liquid may not rise back into the upper portion of the chamber, reentering the gas flow.

The extractor housing 100 includes a mounting flange 150 which may be used for attachment of the extractor housing 100 to a solid surface (not shown). At FIGS. 1 and 2, the mounting flange 150 is illustrated as being normal to the longitudinal axis of the extractor housing 100, but it would be evident to one of ordinary skill in the art that the mounting flange 140 may be adapted for mounting the extractor housing 100 to a vertical or oblique surface without departing from the spirit of the present invention.

Now referring to FIGS. 3 through 6, the separator, which includes an extractor insert 200 and a diffuser plate 218, will be described. The extractor insert 200 consists of a hollow, substantially cylindrical extractor tube 210. The extractor tube 210 is opened at a first end located exterior to the housing 100, and closed at a second end by an end cap 212 having a substantially hemispherical internal shape. The extractor tube 210 has an external diameter slightly smaller than the interior diameter of the extractor sleeve 120, thereby allowing the extractor tube to easily slide into the extractor sleeve 120. An extractor tube flange 214 is mounted substantially normal to and around the first, open end of the extractor tube 210. The extractor tube flange 214 is adapted to be captured between the insert flange 122 and a cooperating flange (not shown) formed in a pipe (not shown) to which the liquid extractor sleeve 120 is to be attached, thereby securing the extractor insert 200 within the extractor sleeve 120 such that the extractor insert 200 may extend into the separator chamber 102 in a stable manner.

A plurality of extractor apertures 216 are formed in a lower surface of the extractor tube 210, extending from a point where the extractor tube 210 lies fully within the separator chamber 102 to a point proximate the end of the extractor tube 210 proximate the end cap 212.

Figure 4:
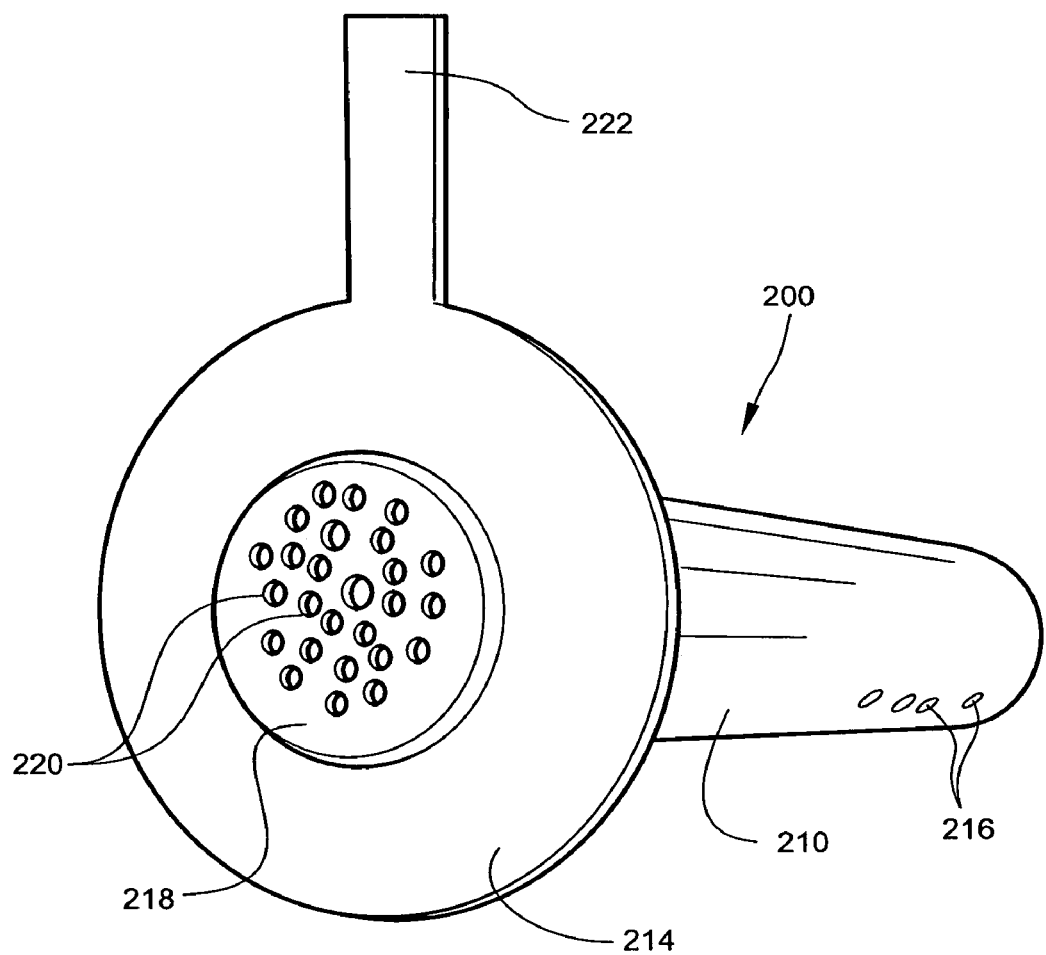
FIG. 4 is a perspective view of the extractor insert of the present invention, with the diffuser in place.
Figure 6:
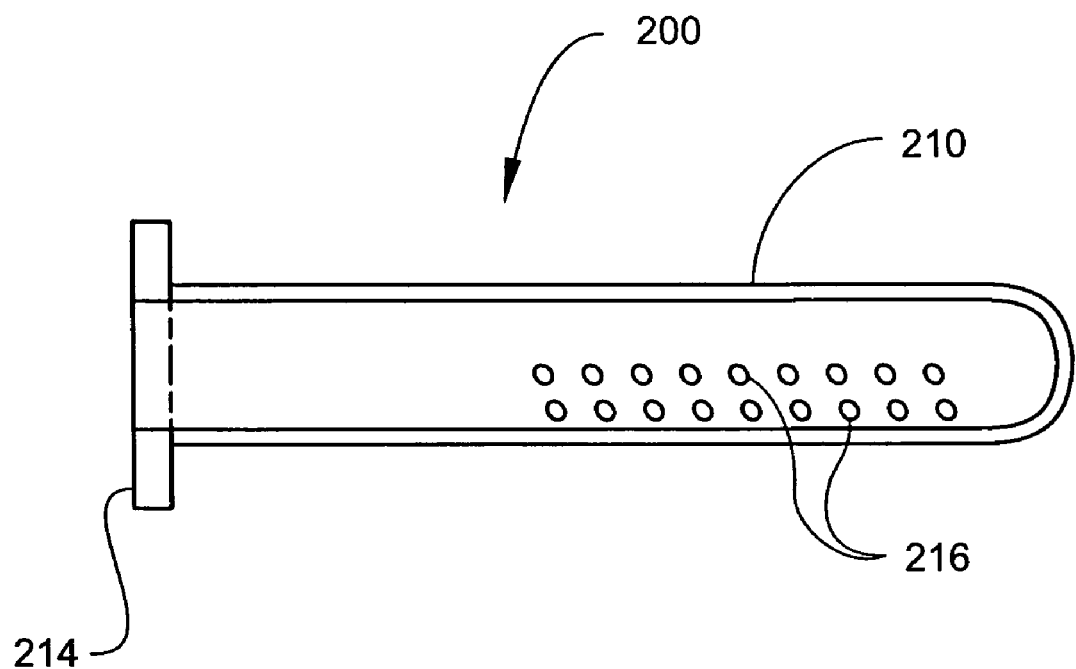
FIG. 6 is a cutaway view of the extractor insert at line 6—6 of FIG. 5.

A diffuser plate 218 having a plurality of diffuser apertures 220 is fitted within the open end of the extractor tube 210 (FIG. 4). The diffuser serves two functions. First, the diffuser causes the gas flowing through the liquid extractor 1 to flow in a straight line, and secondly, the diffuser causes a pressure drop in the gas flow.

An information tag 222 may be attached to an edge of the extractor tube flange 214, thereby allowing information such as flow rates, serial numbers and the like to be easily visible when the extractor insert 200 is in place within the extractor housing 100.

In operation, the liquid extractor 1 is installed into a gas line such that the gas enters through the extractor insert 200 and exits through the gas outlet 110. The gas passes through the separator, made up of the diffuser 218 and the extractor insert 200, passing first through the diffuser apertures 220, causing the gas flow to align itself, and causing a drop in the pressure within the line. As the gas hits the rounded interior of the end cap 212, the flow is forced into a spin within the extractor insert 200. Between the pressure drop caused by the diffuser 218 and the centrifugal force caused by the spin induced by the rounded end cap 212, liquids suspended within the gas flow are spun out of the gas. Thus, the separator passively separates the entrained liquid from the gas. There is no active manipulation of the gas by the separator or any other portion of the extractor. Liquid extraction relies, instead, solely upon the reaction of the gas to the physical configuration of the flow path through the separator 1. Both the separated liquid and the gas then flow out of the extractor insert 200 through the extractor apertures 216, with the liquid falling through the baffle 140 and the gas rising to exit the liquid extractor 1 through the gas outlet 110 at the top. The placement of the extractor apertures in the bottom surface, as opposed to the top or around the entire circumference of the extractor tube 210, prevents the gas from rising to the gas outlet 110 before the fluids are extracted. Fluids accumulating in the lower portion of the separator chamber 102 are periodically drained, either manually or automatically, through the drain 130 at the bottom of the separator chamber 102.

All components of the liquid extractor are typically formed of Schedule 40 steel, but it would be evident to one of ordinary skill in the art that the exact materials may vary without departing from the spirit of the present invention.

It is to be understood that the present invention is not limited to the embodiments described above, but encompasses any and all embodiments within the scope of the following claims.

What is claimed is:

1. A liquid extractor for separating entrained liquids from gasses flowing through a gas line comprising:
    housing means for being positioned within a flow path of a gas line, said housing means having an inlet and an outlet, whereby gas flowing through said gas line enters said housing means inlet, passes through said housing means, and exits said housing means outlet, said housing means outlet being located at an upper end of said housing means;
a separator which passively separates liquids entrained in gasses flowing through said extractor, said separator comprising:
an extractor insert mounted within said housing means such that any gas entering said housing means inlet is directed through said extractor insert prior to exiting said housing means via said housing means outlet, said extractor insert having an extractor insert inlet and an extractor insert outlet by means of which said gases respectively enter and exit said extractor insert, and
a diffuser positioned at said extractor insert inlet, said diffuser causing the gas flowing through said liquid extractor to flow in a straight line as it exits said diffuser and causing a pressure drop in the gas flow;
whereby gasses which enter said housing inlet means pass through said diffuser, which aligns the gas and causes a pressure drop, said gasses continue through said extractor insert, which separates any liquid entrained in said gasses, whereupon said separated liquid collects in a lower portion of said housing means and said gasses exit said extractor via said housing means outlet.

2. The liquid extractor of claim 1, wherein said extractor insert comprises a substantially tubular element removably mounted within said housing means inlet such that said tubular element extends laterally from a wall of said housing means to an interior portion of said housing means, said tubular element positioned at a distance from a lower end of said housing means;
said tubular element having:
a first end positioned at said inlet of said housing means, said first end being open and comprising an extractor insert inlet,
a second end positioned remote from said housing means inlet, said second end being closed, said closed second end having a substantially hemispherical interior shape; and
a plurality of extractor insert apertures positioned in a lower portion of said tubular element;
whereby gas entering said extractor insert, having been aligned and caused to have a drop in pressure by said diffuser, flows toward said hemispherical closed end of said extractor insert, which forces said gas into a spin, thereby creating a centrifugal force on said gas; the combination of the pressure drop and the centrifugal force causing liquid suspended within the gas to spin out of the gas, whereupon both the separated liquid and the gas exit said extractor insert via said extractor insert apertures, with the liquid falling to said lower portion of said housing means and the gas flowing up and out of said housing means outlet.

3. The liquid extractor of claim 2, wherein said diffuser comprises a diffuser plate having a plurality of apertures, said diffuser plate being fitted within said extractor insert inlet.

4. The liquid extractor of claim 1, further comprising a drain located in said lower portion of said housing means, whereby liquid which collects within said housing means can be drained therefrom.

5. The liquid extractor of claim 1, further comprising a liquid permeable baffle positioned within said housing means to separate said housing means into an upper portion and a lower portion, whereby liquid which is extracted from said gas passes from said upper portion, through said baffle, and into said lower portion.

6. The liquid extractor of claim 5, wherein said liquid permeable baffle has only one-way permeability, whereby liquid may pass through said baffle into said lower portion of said housing means, while vapors of the liquid may not rise back into said upper portion of said housing means to reenter the gas flow.

7. The liquid extractor of claim 1, further comprising mounting means for attaching said housing means to a solid surface.

8. The liquid extractor of claim 2, further comprising an extractor insert sleeve having a first end and a second end, said extractor insert sleeve positioned through said housing means inlet such that said first end is located exterior to said housing means and said second end is positioned a short distance into the interior of said housing means, said extractor insert sleeve comprising a substantially cylindrical tube having an inner diameter sized to slidingly receive said extractor insert therein such that said closed second end of said extractor insert and said extractor insert apertures are located beyond said second end of the extractor insert sleeve.

9. The liquid extractor of claim 8, wherein:
said first end of said extractor insert sleeve terminates in an exterior insert sleeve flange whereby said extractor insert sleeve can be mounted to a cooperating flange of an inlet pipe of the gas line in which the extractor is to be mounted;
said first end of said tubular element of said extractor insert terminates in a flange adapted to be captured between said extractor insert sleeve flange and the cooperating flange of the inlet pipe to which the extractor insert sleeve is to be attached, thereby securing said extractor insert tubular element within said extractor insert sleeve.

10. The liquid extractor of claim 9, further comprising an information tag extending from an edge of said flange of said tubular element of said extractor insert, said tag being easily visible when said extractor is secured in place within the gas line as said tag extends out from between said flange of said extractor insert sleeve and the cooperating flange of the inlet pipe to which the extractor insert sleeve is to be attached.

11. The liquid extractor of claim 1, wherein said housing means outlet comprises a substantially tubular opening terminating in an outlet flange whereby said housing means outlet can be mounted to a cooperating flange of a pipe of the gas line in which the extractor is to be mounted.

* * * * *